United States Patent [19]
Smolowitz

[11] Patent Number: 5,407,237
[45] Date of Patent: Apr. 18, 1995

[54] FLEXIBLE COUPLING

[75] Inventor: Matthew M. Smolowitz, Sharonville, Ohio

[73] Assignee: The United States of America as represented by the Secretary of the Air Force, Washington, D.C.

[21] Appl. No.: 25,213

[22] Filed: Feb. 26, 1993

[51] Int. Cl.⁶ ............................................. F16L 21/02
[52] U.S. Cl. ........................................ 285/31; 285/39; 285/55; 285/114; 285/226
[58] Field of Search ................. 285/226, 224, 225, 31, 285/299, 300, 301, 227, 228, 114, 39, 55

[56] References Cited

U.S. PATENT DOCUMENTS

| | | | |
|---|---|---|---|
| 2,470,989 | 5/1949 | Keller et al. | 285/226 X |
| 2,616,728 | 11/1952 | Pitt | 285/11 |
| 2,898,940 | 8/1959 | Cole | 285/301 X |
| 3,232,076 | 2/1966 | Sundt | 64/11 |
| 3,574,354 | 4/1971 | Mischel | 285/226 X |
| 3,672,705 | 6/1972 | Rush | 285/39 |
| 3,758,932 | 9/1973 | Burtis | 285/227 X |
| 3,891,396 | 6/1975 | Mussall et al. | 23/288 F |
| 4,072,329 | 2/1978 | Mutchler | 285/187 |
| 4,548,429 | 10/1985 | Merz | 285/229 X |
| 5,145,215 | 9/1992 | Udell | 285/226 X |

FOREIGN PATENT DOCUMENTS

| | | | |
|---|---|---|---|
| 2644552 | 9/1990 | France | 285/226 |
| 2013810 | 8/1979 | United Kingdom | 285/229 |
| 309198 | 7/1971 | U.S.S.R. | 285/226 |

Primary Examiner—Dave W. Arola
Attorney, Agent, or Firm—Donald J. Singer; Thomas C. Stover

[57] ABSTRACT

A flexible coupling is provided for two relatively movable pipes, which coupling has
a) a bellows tube having transversely corrugated sidewalls which bellows terminates in two rounded nozzles, which nozzles insert into connecting pipes, (e.g. in the air bypass duct of a gas turbine engine) and
b) means to seal each nozzle in each respective pipe such that upon relative axial and lateral displacement between connecting pipes, the bellows tube flexes to maintain the sealed juncture between it and the connecting pipes.

8 Claims, 3 Drawing Sheets

FLEXIBLE COUPLING

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a coupling for joining two or more pipes, particularly a flexible coupling therefor.

2. The Prior Art

Most piping systems require some flexibility to accommodate assembly and operational mismatches. These systems typically have the flexibility components separate from the rigid joints. Both the joints and the flexibility components require sealing to keep the system pressurized and prevent significant leakage. In meeting these requirements some systems can be complex as well as bulky.

A prior art system such as shown in FIG. 1 hereof, employs a clamp or Marman joint 10 to attach two fluid supply pipes 12 and 14, per FIG. 1. The pipe 14 terminates in an outer coupling 16 which has a recess 18 therein to receive inner coupling 20 of pipe 22, per FIG. 1. Outer coupling 16 and inner coupling 20 define a slip joint to provide longitudinal or axial extension and retraction but not lateral movement, between the so-connecting pipes 14 and 22, as indicated in FIG. 1.

That is, such slip joint provides primarily uniaxial relief with minimal lateral flexibility.

In other prior art, U.S. Pat. Nos. 2,616,728 to Pitt (1952), 3,672,705 to Rush (1972) and 4,072,329 to Mutchler (1978) disclose flexible linear expansion joints for connecting pipes. In each case however, one pipe extends into or overlaps with the other, providing for axial extension and retraction but inhibiting lateral movement therebetween.

Accordingly, there is need and market for a flexible coupling for pipes that overcomes the above prior art shortcomings.

There has now been discovered, a flexible connection for relatively movable pipes which permits lateral as well as axial displacement therebetween while maintaining a fluid seal between the so-connecting pipes.

SUMMARY OF THE INVENTION

Broadly the present invention provides, a flexible connector for at least two relatively movable pipes comprising:
 a) a bellows tube having transversely corrugated flexible sidewalls, which tube terminates at each of at least two ends in a rounded hollow nozzle, which two nozzles are sized to engage and connect the two pipes in a spaced-apart, telescope-free manner and
 b) means to seal each nozzle in each respective pipe such that on relative axial and lateral movement between the pipes, the bellows tube flexes to maintain the sealed juncture between the pipes.

By nozzles which "engage" the pipes is meant, nozzles which fit into, fit over or abut connecting pipes. Where a nozzle abuts a pipe, a coupling ring or other fitting can join nozzle and pipe together as is known in the art.

BRIEF DESCRIPTION OF THE DRAWINGS

The invention will become more apparent from the following detailed specification and drawings in which.

DESCRIPTION OF PREFERRED EMBODIMENTS

Figure 2:
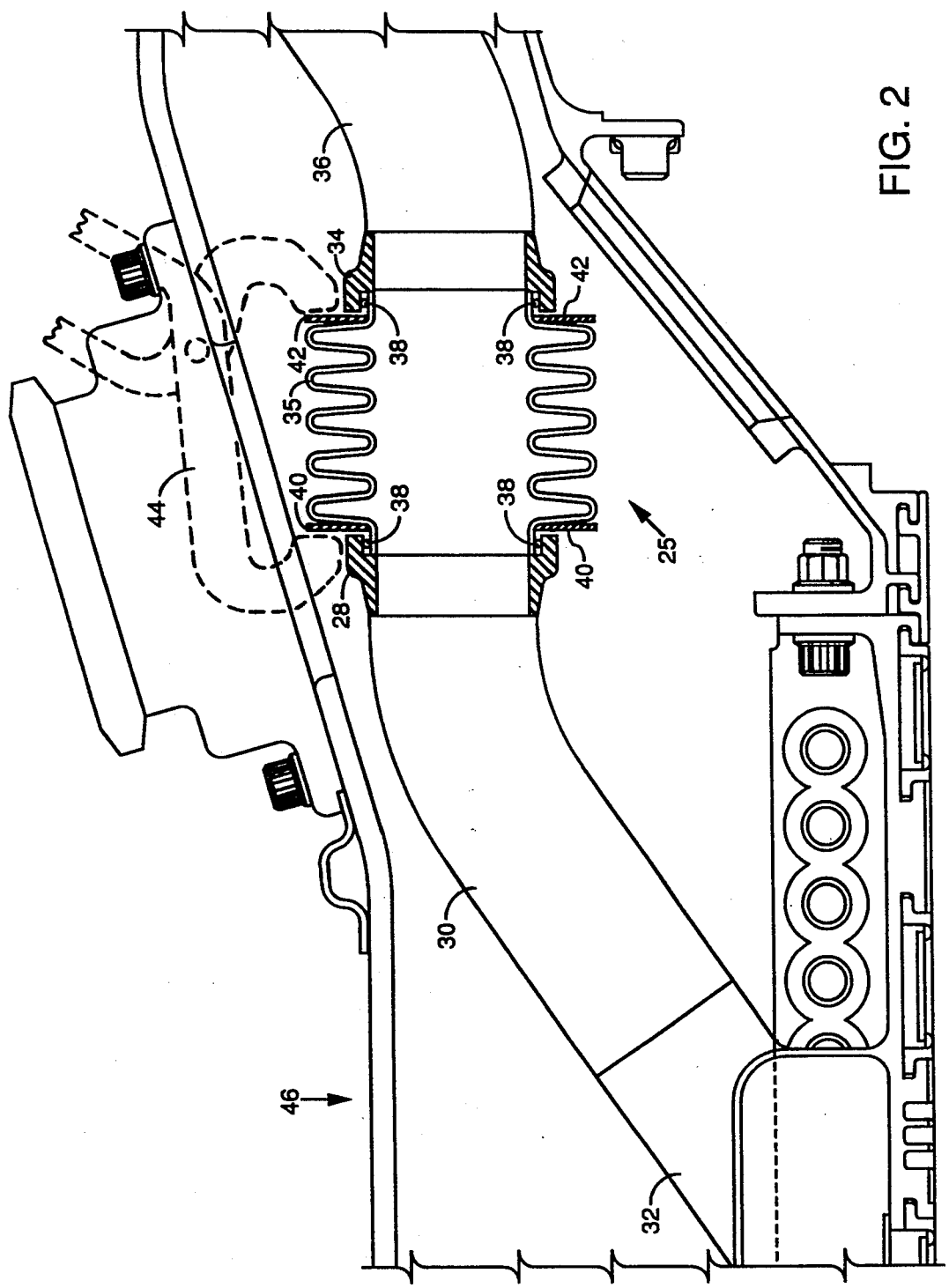
FIG. 2 is a sectional elevation schematic view of a flexible pipe coupling embodying the present invention.

Referring in more detail to the drawings, flexible coupling 25 is suitable for use in jet engine bleed piping. Thus flexible coupling 25 connects at one, end to pipe flange 28, which is welded in turn to bleed pipe 30, in turn welded at its other end to manifold transition pipe 32, as shown in FIG. 2 hereof. The other end of the flexible coupling 25 connects to pipe flange 34, in turn welded to downstream bleed pipe 36, as shown in FIG. 2.

The flexible coupling 25 includes a corrugated pressure vessel or bellows 35, which is self-sealing due to installation compression and higher internal pressure against the bleed pipe flanges 28 and 34, as indicated in FIG. 2.

O rings 38 can be mounted between the bellows 35 and the inner surfaces of the pipe flanges 28 and 34 to obtain redundant sealing between such bellows and the two pipe flanges, as shown in FIG. 2. For added strength during assembly and disassembly plus improved seating against pipe flanges 28 and 34, washers 40 and 42 can be integral with or separate from, each end of the bellows 35 as shown or indicated in FIG. 2.

The design of FIG. 2 provides increased misalignment tolerance (both axially and laterally) as well as self-sealing capabilities as discussed above. The flexible coupling 25 of the invention can be readily removed from one or both pipe flanges 28 and 34 by compression of the washers 40 and 42, either by hand or by a simple tool such as a channel lock 44, shown in phantom in FIG. 2, to remove or install the flexible coupling 25.

Thus the flexible coupling 25 embodiment of the invention, shown in FIG. 2, located in gas turbine engine housing 46, permits considerable lateral (and axial) movement between bleed pipes 30 and 36 in a high temperature, high pressure environment, while maintaining durable self-sealing therein, as indicated in FIG. 2.

Figure 3:
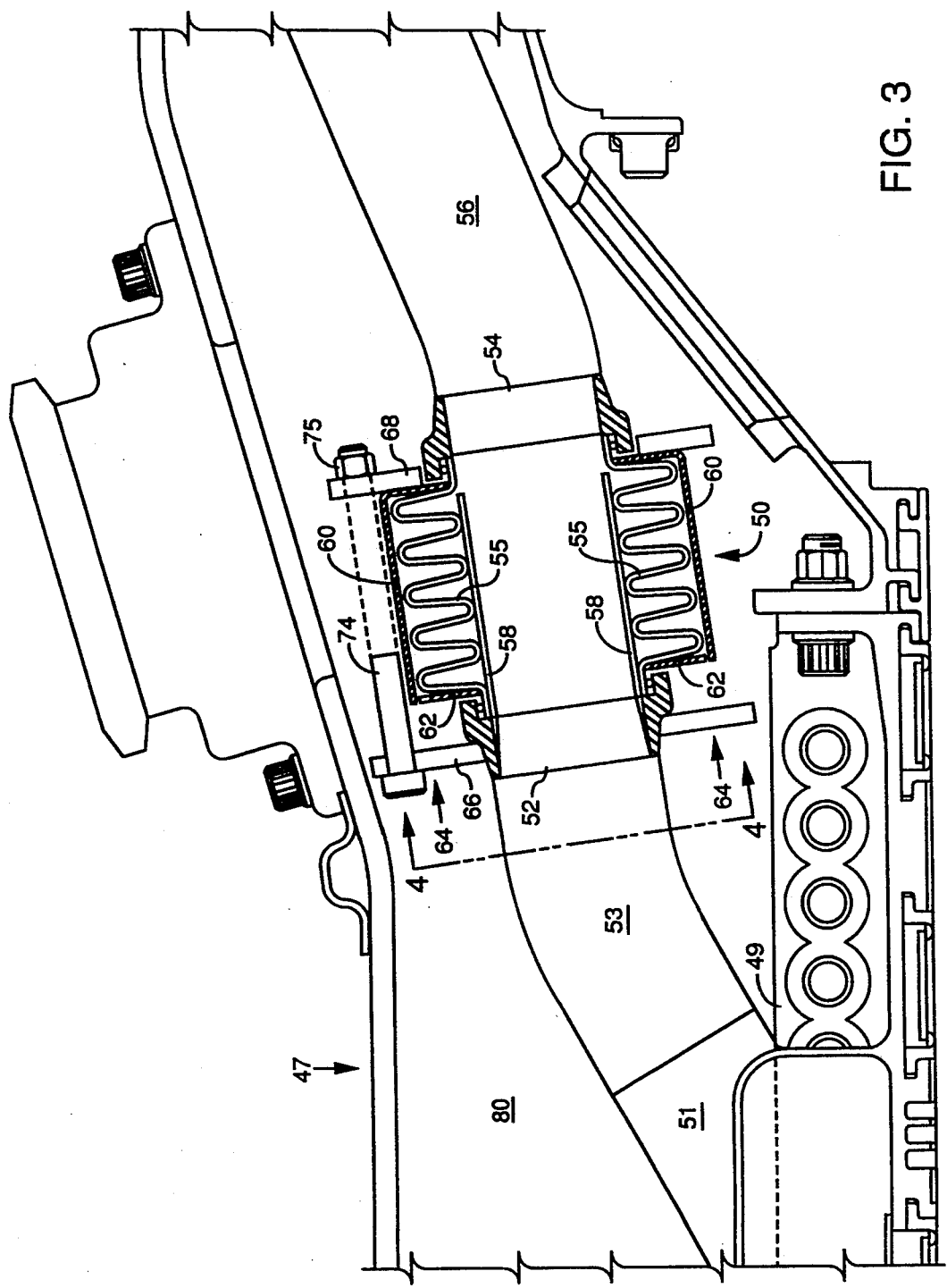

In another embodiment of the flexible coupling of the invention, flexible coupling 50 is mounted in and between pipe flanges 52 and 54, as shown in FIG. 3, in the manner described above with respect to flanges 28 and 34 of FIG. 2. The flexible coupling 50 of FIG. 3 has bellows 55 which are protected by a liner or tube 58, which are mounted internally of and can be attached to, the bellows 55 for improved durability thereof, as indicated in FIG. 3. The liner 58 preferably does not extend into the pipe flange 54 when the bellows 55 is under little or no compression, as indicated in FIG. 3, to a) permit significant lateral displacement of pipe flanges 52 and 54 and their respective attached pipes, 53 and 56, as indicated in FIG. 3, b) to leave a gas flow path to pressurize the bellows (for sealing purposes) and c) for ease of installation of the flexible coupling of the invention. That is, the liner desireably fits in the gap between pipe flanges 52 and 54 when the bellows is compressed. However such liner can be longer than such gap if desired within the scope of the invention.

The liner 58 also helps to reduce or prevent acoustical resonances (or whistle effects) created by fluid flow through unlined bellows. Reduced flow losses plus flow restriction and/or metering can be achieved, employing a liner with a conical shape, venturi or other restriction, if desired. The liner 58 can (as noted above) slide inside the bleed pipe 56 during (bellows compression) installation and removal of the flexible coupling 50 embodying the invention in and between pipe flanges 52 and 54, as indicated in FIG. 3. Also upon compression of the bellows after installation thereof, such liner tube is sized to slide through the opposite bellows nozzle, through the pipe flange 54 and into the pipe 56, as necessary depending upon the type and amount of axial compression applied thereto.

Additional durability of the flexible coupling 50 of FIG. 3 is obtained by employing a cup washer 60 external to and free from (or integral with) the bellows 55. The cup washer 60 provides a stop or containment during over-pressure or yield failure of the bellows 55, as indicated in FIG. 3. Such cup washer 60 also protects the bellows 55 from handling damage after installation and before removal thereof. Advantageously, the bellows are further protected by adding flat washer 62, as shown in FIG. 3. The cup washer 60 can be short enough so as not to overlap the flat washer 62 if desired, or such washer 62 can be of reduced diameter to provide greater lateral flexibility between pipe flanges 52 and 54.

Figure 4:
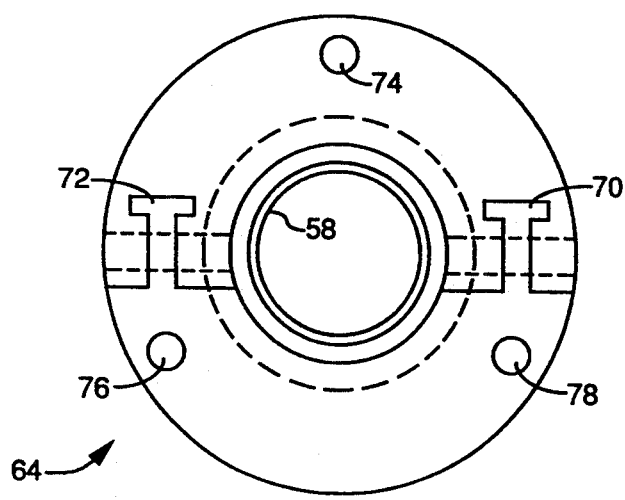
FIG. 3 is a sectional elevation schematic view of another flexible coupling embodiment of the present invention and FIG. 4 is an elevation view, taken on lines 4—4 of FIG. 3, looking in the direction of the arrows, of a tool employed with a flexible coupling embodiment of the invention.

For removal of the flexible coupling embodiment 50 of the invention with cup washer 60, a split collared tool 64, shown in FIGS. 3 and 4 is desirably employed. Such tool has a forward split collar 66 and a rear collar 68, as shown in FIG. 3. Both collars 66 and 68 contain T slots 70 and 72 and bolts or set screws 74, 76, and 78, to hold the collar 64 together during compression of the bellows 55 via torque applied to the compression bolt, e.g., bolt 74 and/or nut 75, as shown in or indicated in FIGS. 3 and 4. As shown in FIG. 3, the forward collar 66 clamps to the compressor case pipe flange 52 and the aft collar 68 clamps against the base of the cup washer 60. This permits the flexible coupling 50 and split collar tool 64, to remain attached to the compressor case pipe 53 (and pipe flange 52) for bellows compression and flexible coupling removal and installation between pipe flanges 52 and 54, as indicated in FIG. 3.

Accordingly, the embodiment of FIG. 2 permits considerable lateral and axial movement of the pipes and their pipe flanges 28 and 34, while maintaining a tight seal therebetween.

Similarly the pipe coupling embodiment 50 shown in FIG. 3 permits considerable axial and lateral relative displacement between pipe flanges 52 and 54, while providing a liner within the bellows 55, for more streamlined fluid flow therein and while providing a cup washer 68 around such bellows 55 for transverse containment of such bellows e.g., during over-pressure conditions.

However either flexible coupling embodiment of the invention is highly suited for use in a high temperature, high pressure environment. In the example shown in FIG. 3 (or in FIG. 2), the flexible coupling of the invention is highly suitable for use in, e.g. a bypass duct 80, in a gas turbine engine 47 having a compressor 49, a manifold transition pipe 51, a compressor case pipe 53, pipe flange 52, flexible coupling 50, pipe flange 54 and high pressure turbine (HPT) pipe 56, as shown in FIG. 3.

Figure 1:
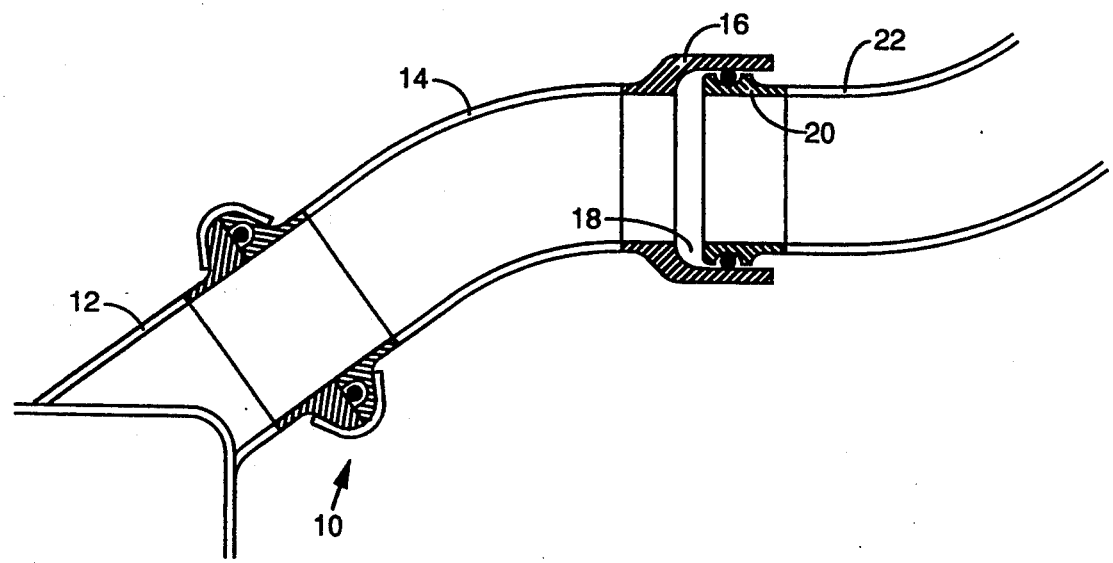
FIG. 1 is a sectional elevation schematic view of a pipe coupling of the prior art.

In addition, to minimize the over-hang of the bleed pipe or compressor case pipe welded to the manifold, e.g. pipe 30 shown in FIG. 2 and pipe 53 shown in FIG. 3, the flexible coupling of the invention can be mounted closer to the manifold (like the Marman flange in FIG. 1 hereof) by lengthening the HPT frame cooling supply (bleed) pipe.

The bellows employed in the flexible coupling of the invention can be of various flexible materials e.g. rubber, plastic, and/or metal such as corrugated steel sheet or foil, as desired within the scope of the present invention.

The tube liner mounted within the bellows and the cup washer mounted without, are desirably made of, e.g. ceramic or metal, e.g. steel.

Thus the flexible seal embodiments of the invention have sufficient flexibility to accommodate assembly and operational pipe mismatches, non-alignments or displacements, axially and laterally, while maintaining tight sealing between the pipes.

What is claimed is:

1. A flexible coupling for at least two relatively movable pipes comprising:
    a) a bellows tube having transversely corrugated flexible sidewalls or bellows which terminate at each of two ends in a rounded hollow nozzle, each of which nozzles are sized to engage and connect said two pipes in a spaced-apart, telescope-free manner,
    b) sealing means for sealing each nozzle to each respective pipe such that on relative axial and lateral displacement between said pipes, said bellows tube flexes to maintain the sealed juncture between said pipes and
    c) means for axially compressing said bellows tube sufficiently to enable its removal and installation between said two spaced-apart pipes.

2. The flexible coupling of claim 1 wherein each said nozzle fits within, around or abuts at least one of said pipes.

3. The flexible coupling of claim 1 wherein each respective pipe includes a pipe flange and each said nozzle fits within the pipe flange of one of said pipes and said sealing means comprises an O-ring mounted between an outer surface of said nozzle and an inner surface of said pipe flange.

4. The flexible coupling of claim 3 wherein said bellows are made of material selected from the group consisting of rubber, plastic, metal or a combination thereof.

5. The flexible coupling of claim 1 wherein each respective pipe includes a pipe flange and said bellows tube is mounted so that each said nozzle fits in one of said pipe flanges and a flat washer is positioned around each said nozzle axially between said bellows and a portion of its associated flange to reduce wear between bellows and flange.

6. The flexible coupling of claim 1 mounted in the air bypass duct of a gas turbine engine.

7. The flexible coupling of claim 1, having a tubular liner mounted within said bellows such that the liner is in axial alignment with the flow-through axis of said coupling and the periphery of said liner engages and extends across a plurality of inner surfaces of said bellows, said liner providing a flow channel through said bellows of reduced turbulence.

8. The flexible coupling of claim 7 wherein said bellows has an external cup washer mounted thereover for containment of said bellows from undue transverse expansion thereof.

* * * * *